United States Patent
Gan et al.

(10) Patent No.: US 7,039,402 B1
(45) Date of Patent: May 2, 2006

(54) DISASTER RECOVERY FOR VERY LARGE GSM/UMTS HLR DATABASES

(75) Inventors: Hock Gan, Potters Bar (GB); Pallab Sarkar, Bracknell (GB); Darren Kohler, Maidenhead (GB)

(73) Assignee: Nortel Networks Limited, St. Laurent (CA)

( * ) Notice: Subject to any disclaimer, the term of this patent is extended or adjusted under 35 U.S.C. 154(b) by 296 days.

(21) Appl. No.: 10/634,555

(22) Filed: Aug. 5, 2003

(51) Int. Cl.
*H04Q 7/20* (2006.01)

(52) U.S. Cl. .................. 455/433; 455/432.3; 455/428; 455/436

(58) Field of Classification Search ................ 455/433, 455/432.3, 435.1, 445, 424, 560; 379/221.03, 379/221.01, 219; 707/201, 8, 10
See application file for complete search history.

(56) References Cited

U.S. PATENT DOCUMENTS

| | | | | |
|---|---|---|---|---|
| 5,623,532 A | * | 4/1997 | Houde et al. ................ 455/445 |
| 5,873,101 A | * | 2/1999 | Klein ......................... 707/201 |
| 5,953,622 A | * | 9/1999 | Lee et al. .................... 438/458 |
| 6,115,463 A | * | 9/2000 | Coulombe et al. ........... 379/219 |
| 6,144,857 A | * | 11/2000 | Price et al. .................. 455/445 |
| 6,157,831 A | * | 12/2000 | Lamb .......................... 455/433 |
| 6,360,096 B1 | * | 3/2002 | Charpentier et al. ........ 455/433 |
| 6,421,537 B1 | * | 7/2002 | Lamb et al. ................. 455/433 |
| 2003/0004947 A1 | * | 1/2003 | Coverston ....................... 707/9 |
| 2003/0078042 A1 | * | 4/2003 | Miriyala et al. ............. 455/435 |
| 2005/0101297 A1 | * | 5/2005 | Delaney et al. ............. 455/403 |

* cited by examiner

*Primary Examiner*—Joseph Feild
*Assistant Examiner*—Kamran Afshar
(74) *Attorney, Agent, or Firm*—Barnes & Thornburg LLP (57) ABSTRACT

An HLR register for maintaining data relating to mobile users of a network for use by the network, the register being arranged to be coupled to a mate register at a remote location for back up of the data, the register being divided into segments and arranged to carry out a partial handover to the mate register by handing over maintenance of data of one or some of the segments to the mate register temporarily. By allowing a partial handover rather than requiring a complete handover, the handover can be simpler and quicker. This can reduce the risk of loss of data or reduce an amount of down time and consequential losses of revenue. This is particularly important for larger registers. The handover can be triggered by a fault in the segment or for the purpose of planned maintenance for example. It can be triggered manually or automatically.

14 Claims, 8 Drawing Sheets

FIG 1

DISASTER RECOVERY FOR VERY LARGE GSM/UMTS HLR DATABASES

RELATED APPLICATIONS

This invention is related to copending U.S. patent application Ser. No. 10/323,411 "HLR MATED-PAIR AUTO CUTOVER" (Nortel Networks ref 156671D), and to U.S. patent application Ser. No. 09/286,087 "HLR data migration" (Nortel Networks ref ID 1070), both hereby incorporated by reference.

FIELD OF THE INVENTION

This invention relates to registers such as home location registers for networks, to methods of maintaining data relating to users, to methods of offering a communication service over such apparatus, and to signals used by such apparatus or methods.

BACKGROUND TO THE INVENTION

Mobile telephone networks typically include a mobile switching center MSC and a number of registers in the form of databases accessed during the establishment of a telephone call connection or other events in the network. These databases include a home location register HLR and a visitor location register VLR. They store both static (i.e., non-changing) and dynamic (i.e., changing) data related to the subscribers. The static data includes, for example, a list of identifiers of cooperating exchanges interconnected with the mobile switching center, an identification of the services permitted for each subscriber, and parameters for such services. The dynamic data can include, for example, subscriber defined service data such as preferences, mobile station location data, and mobile station activity data.

An HLR database has to be extremely robust. The failure of an HLR normally brings a GSM/UMTS network to a halt. As the HLR gets progressively larger with improvements in technology, even partial failures of the database become a major concern for the operator. Each partial failure may impact a large number of subscribers resulting in huge losses of revenue. This invention eliminates outages caused by such failures in a seamless fashion. One example of such failures is geographical disasters. Whilst it is a common expectation that the HLR is completely destroyed, it is not impossible to find disasters where there is partial loss of equipment.

The HLR contains data needed to establish a telephone connection within the mobile telephone network, so any failure of the HLR will deprive a substantial number of subscribers of service, and correspondingly affect operator revenue. Conventionally, the hardware and software is arranged for high reliability and availability, typically using mirroring techniques and local backup storage. To give some geographical redundancy, each HLR is often coupled to another HLR at a different location, to create a mated pair and the load is split between them, often but not necessarily, in 50—50 proportion. If one has all or the majority of the load, it is referred to as the master HLR, and the other as the slave. The two HLRs are located with sufficient geographical separation to provide resilience to local events such as floods or earthquakes. In the case of a disaster affecting one of them, they are designed to have sufficient capacity for one to handle the entire load. This requires a cutover operation. A GSM/GPRS/UMTS (Global system mobile)/(General Packet Radio Service)/(Universal Mobile Telecommunication System) HLR Mated-Pair Disaster Cutover (also referred to as failover) involves an HLR in a mated-pair arrangement detecting that it's mate HLR has undergone a "disaster" and then "switching over" to provide an active service for the subscribers belonging to the mate HLR (as well as continuing to provide an active service for its set of home subscribers). Note that the word "disaster" in this context includes one of the HLRs in a mated-pair becomes inaccessible (Total Route Failure) i.e. all network communication is lost to one of the HLRs, and one of the HLRs in a mated-pair goes out of service (Nodal Failure) e.g. caused as a result of a natural phenomena (e.g. Earthquake).

U.S. Pat. No. 5,623,532 discloses a system where two HLRs support each other to provide geographical redundancy, via an SS7 (Signaling System No. 7) telecommunications network without the need for additional links or interface modules between the two mated HLRs. The two HLRs, are connected through the same two Signal Transfer Points (STPs). Each node in a SS7 telecommunications network is supported by dual STPs. In case the first STP or links between the first STP and the destination node fails, the second STP is utilized to provide reliable network operation by passing the messages for the failed HLR to its paired HLR. Determination of failure of an HLR is made manually by an administrator, or by the STPs, not by the paired HLR.

U.S. Pat. No. 5,953,662 also shows having two HLRs located anywhere within the SS7 network and supporting each other in real time without requiring additional communications links between the two and without destroying the integrity of the data base. This patent goes further than the '532 patent in that it shows the HLRs sending messages to each other over the SS7 network. One use for such messages is for a first HLR to update the contents of its data base to conform to that of its paired HLR so that it can take over at any time from the paired HLR, and vice versa. The actual transmission is achieved over the same SS7 telecommunications network utilizing the same Signal Transfer Points (STPs).

The HLRs also monitor each other for failure by sending occasional heartbeat messages to each other. A lack of response to a heartbeat is interpreted by a first HLR as indicating a failure of the other HLR. As the lack of response lasts longer, the perceived failure status of the paired HLR is upgraded from temporarily out of contact to inoperable. As before, should the other HLR fail, signals from other entities intended for the other HLR are rerouted by the local STP of the SS7 network to the first HLR: for processing.

The problem of recovering from faults and the resumption of service of subscribers belonging to such GSM/UMTS HLR databases undergoing failures increases as the size of the databases increases. Very large databases now imply a size typically above several million subscribers. A typical size would be 10 million subscribers. It is known to provide redundancy within one HLR by using servers with active back up at the same location. In addition, geographical disasters would be dealt with by having redundancy in the form of mated-pairs. Commonly, the implementation for disaster recovery is a complete takeover of the faulty HLR and repair of the HLR followed by a re-mating process. The short coming of this is that it is expensive to takeover and recover a mated-pair relationship of a complete HLR. Data can be lost in the takeover. Recovery for a very large HLR takes a lot of effort and is thus costly.

SUMMARY OF THE INVENTION

It is an object of the present invention to provide improved apparatus and methods. According to a first aspect of the present invention, there is provided: a register for maintaining data relating to current location of users of a network for use by the network, the register being arranged for coupling to a mate register at a remote location for back up of the data, the register being divided into segments and arranged to carry out a partial handover to the mate register by handing over maintenance of data of one or some of the segments to the mate register temporarily.

By allowing a partial handover rather than requiring a complete handover, the handover can be simpler and quicker. This can reduce the risk of loss of data or reduce an amount of down time and consequential losses of revenue. This is particularly important for larger registers. The handover can be triggered by a fault in the segment or for the purpose of planned maintenance for example. It can be triggered manually or automatically. The segmentation can be matching in the mated pair or non matching. Matching the segments means each user or subscriber is in the same segment in both registers. This can reduce the addressing overhead when messages are sent relating to a given user, since the segment will be known from the user identity. However, an advantage of non matching is that subscribers can be moved from segment to segment in each register with no need to alert the mate register to maintain the matching. The segments can be any type, including software partitions stored anywhere in memory, or separate memory addresses, or separate hardware such as separate cards in a rack, or distributed hardware with its own back up, or other types for example.

Additional features for dependent claims include:

a) maintaining the data involving using the data to respond to network transactions and updating the data.

b) The register being a home location register. This is currently usually the largest register, and is used as a reference by other registers such as the VLR, though in principle other registers could become larger and take over maintaining some of the user data.

c) The handover being carried out on a per user basis. This can enable prevent outages of large numbers of subscribers at any one time, and can reduce peak traffic loads for example.

d) the segmentation not being matched at the mate register. This can give flexibility at each HLR to allocate users' data to any segment and move data between segments. It reduces or avoids the overhead involved in alerting the matching register of all changes in allocation of users' data to particular segments.

e) A central controller for controlling the handovers and maintaining a map of which users belong to which segment. This can be simpler to manage if handled centrally. This can mean only a single logical address is needed for receiving messages at each register. An alternative of having an address for each segment would be possible but more complex. It could be useful to enable a distributed register, to add to the geographical redundancy.

f) The handover comprising for a given one of the users sending a message to the mate, setting the user's status to standby and diverting to the mate any requests from the network to access the data for that user. This should be a rapid operation with a minimum of overhead and delay so that there is little loss of service. It need not wait for existing transactions to be completed, if it is triggered by a fault in the segment. It can be carried out without transferring data to limit delay if triggered by a fault, since: the local data can be assumed to be corrupted.

g) the register being arranged to receive a handover request from the mate for a given one of the users, setting the user's status to active, and responding to any requests from the network to access the data for that user.

h) the register being arranged to initiate a handback operation for a given one of the users, involving requesting a copy of the data from the mate, and once received, setting the user's status to active, and responding to any requests from the network to access the data for that user.

i) the register being arranged to respond to a handback request from the mate register for a given one of the users, involving sending a copy of the data to the mate, setting the user's status to standby, and diverting to the mate register any requests from the network to access the data for that user.

j) the register being arranged to respond to the handback request only when any transaction has ceased. This can help ensure an orderly handback and avoid risk of loss of data.

k) the register being arranged to cease backing up data with the mate after a handover has been initiated.

l) for users of the handed over segment for whom the mate register is normally in an active state, there is no need for a handover, but their data is assumed to be invalid and a full copy is requested from mate. This can be delivered either as soon as the mate is ready or later when the mate would send an update anyway. This means the refresh can be scheduled to avoid overload at peak times when processing capacity may need to be optimized, such as immediately after a register fault has been cleared.

m) the register is implemented in the form of software. This acknowledges that software can be a valuable, separately tradable commodity. It is intended to encompass software, which runs on or controls "dumb" or standard hardware, to carry out the desired "functions," (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a method of maintaining data relating to mobile users of a network for use by the network. Another aspect provides a method of offering a communications service over a network having the above mentioned register. The advantages of the register can feed through to enable improvements in the level of service for communications services over the network. The added value to the services could prove far greater than the sales value of the equipment. Also the benefit for the services can be obtained even using a register located outside the jurisdiction, hence it is worth claiming the services directly. Such communications service can include a mobile phone service, or mobile access to data such as emails or the internet. Other aspects include signals between the register and the mate register, and signals between users and the register. This can give useful coverage if the registers are outside the jurisdiction since users can benefit from the advantages even if one or both registers are outside the jurisdiction. Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 1:
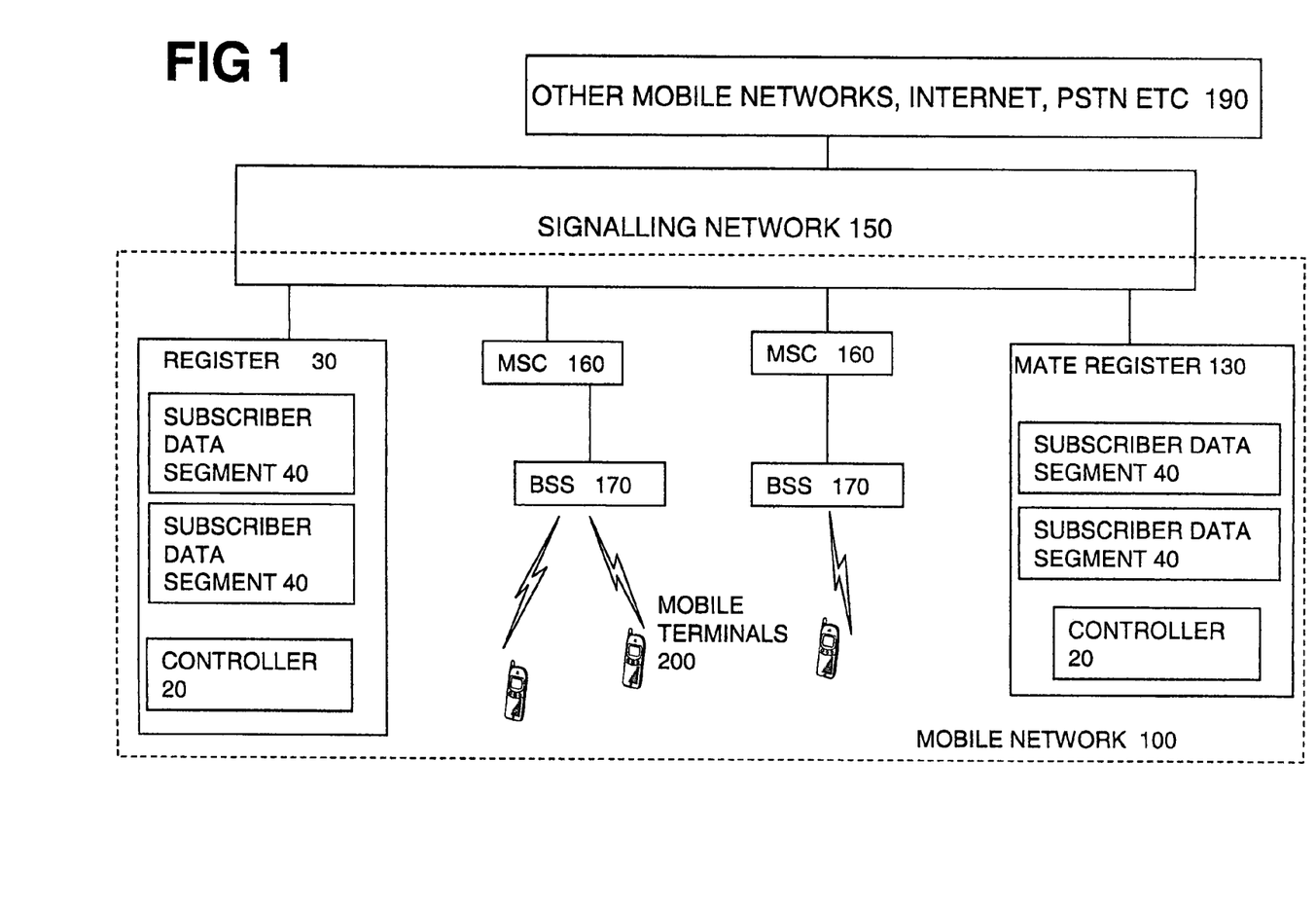
FIG. 1 shows an overview of parts of a mobile communications network including registers according to embodiments of the invention.

FIG. 1 shows an overview of parts of a mobile communications network including registers according to embodiments of the invention. The mobile network 100 can be any kind of network including, GSM, UMTS, TDMA (time division multiplexed access) and so on. A signaling network 150 is used for passing messages between the elements of the network and other networks. It can be an SS7 network having STPs, or any other type of signaling network having similar features, though only SS7 embodiments are described here. The register 30 can be used for storing any kind of data, such as subscriber data 40 involved in setting up and processing connections or calls or packets over the mobile network. The subscriber data is typically split into permanent data such as subscription details, and temporary data such as current location information. It can be a location register such as a home location register or visitor location register for example, though conceivably it can be other types of registers such as those having secure information related to subscriber identity or billing information. The register is paired or mated with an associated register 130 to provide geographical redundancy. The register includes a number of segments 40 for holding and maintaining user data, and a controller 20, for managing a partial handover, depending on the fault status or other criteria. The mate register has similar elements.

The mobile network includes one or more MSCs 160, for switching connections, calls or packets from mobile terminals 200, to other terminals or other networks 190 such as the PSTN (public service telephone network), other mobile networks, or the internet. The MSC is coupled to the signaling network, and to a base station system BSS 170. The MSC accesses data in the register by sending messages over the signaling network.

Figure 2:
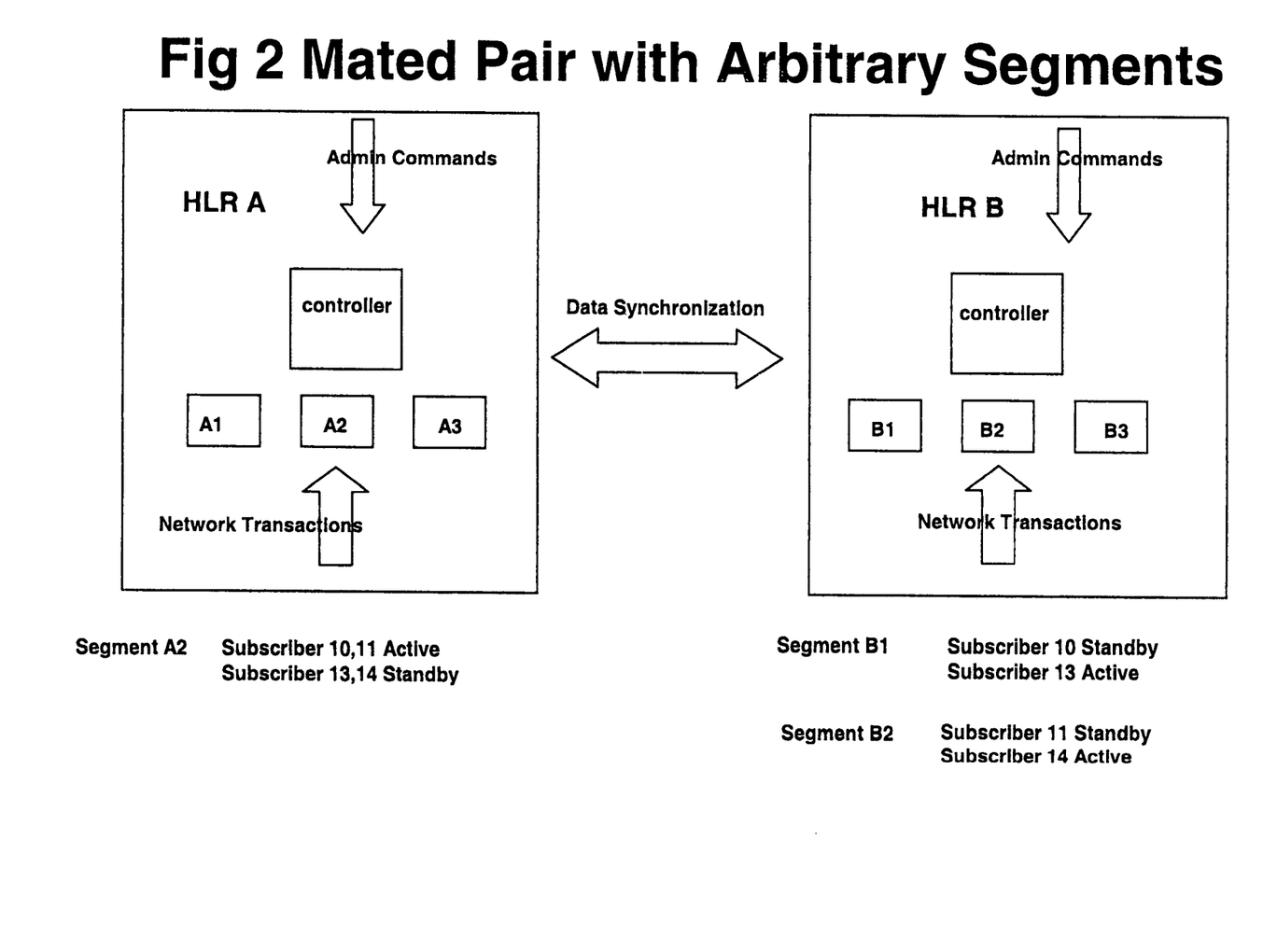
FIG. 2 shows an embodiment in the form of a mated pair with arbitrary segments.

FIG. 2 shows an example of a mated pair of HLRs. Each HLR consists of a controller and a number of segments containing the subscriber data. The segmentation can be arbitrary, the segments need not be the same size. They can be distributed or concentrated. All subscribers are mated between the 2 HLRs in the Mated-Pair, meaning the data for a given subscriber is duplicated in both HLRs, but one HLR is active and one is the back up or standby for that subscriber. The active/standby subscribers may be split in any ratio on each HLR mate, though the ratio is normally near 50:50. Access requests for the data from the network are directed to the active HLR for that user. The standby copy of the data is kept up to date by synchronizing periodically or on request when the active copy is changed. Control of such mated-pair synchronisation is normally handled on a per subscriber basis. The controller coordinates all segments and maintains a mapping of which subscriber is in which of the segments. Segmentation does not need to be maintained consistently between mates. If the controller can route all messages between the HLRs, then only a single logical address is needed to manage for each HLR mate.

In the example shown schematically in FIG. 2, HLR A has 3 segments, A1, A2 and A3. Segment A2 has subscribers 10 and 11 active and subscribers 13 and 14 standby. HLR B has 3 segments, B1, B2 and B3. Segment B1 has subscriber 10 standby and 13 active and segment B2 has subscriber 11 standby and subscriber 14 active. The subscriber data can be read or modified as a result of network transactions such as a subscriber starting a call, or by administration commands such as those caused by a subscriber agreeing to a different tariff or a service such as call divert for example. In one example, a segment can be implemented by a pair of redundant cards, one being a master, the other being on active standby to take over in case of failure of the master card. If this back up redundancy fails for any reason, such as software failure, and the segment as a whole fails, a process is launched in the controller for handing over responsibility for maintaining the data of the segment to the mate at a different location.

Figure 3:
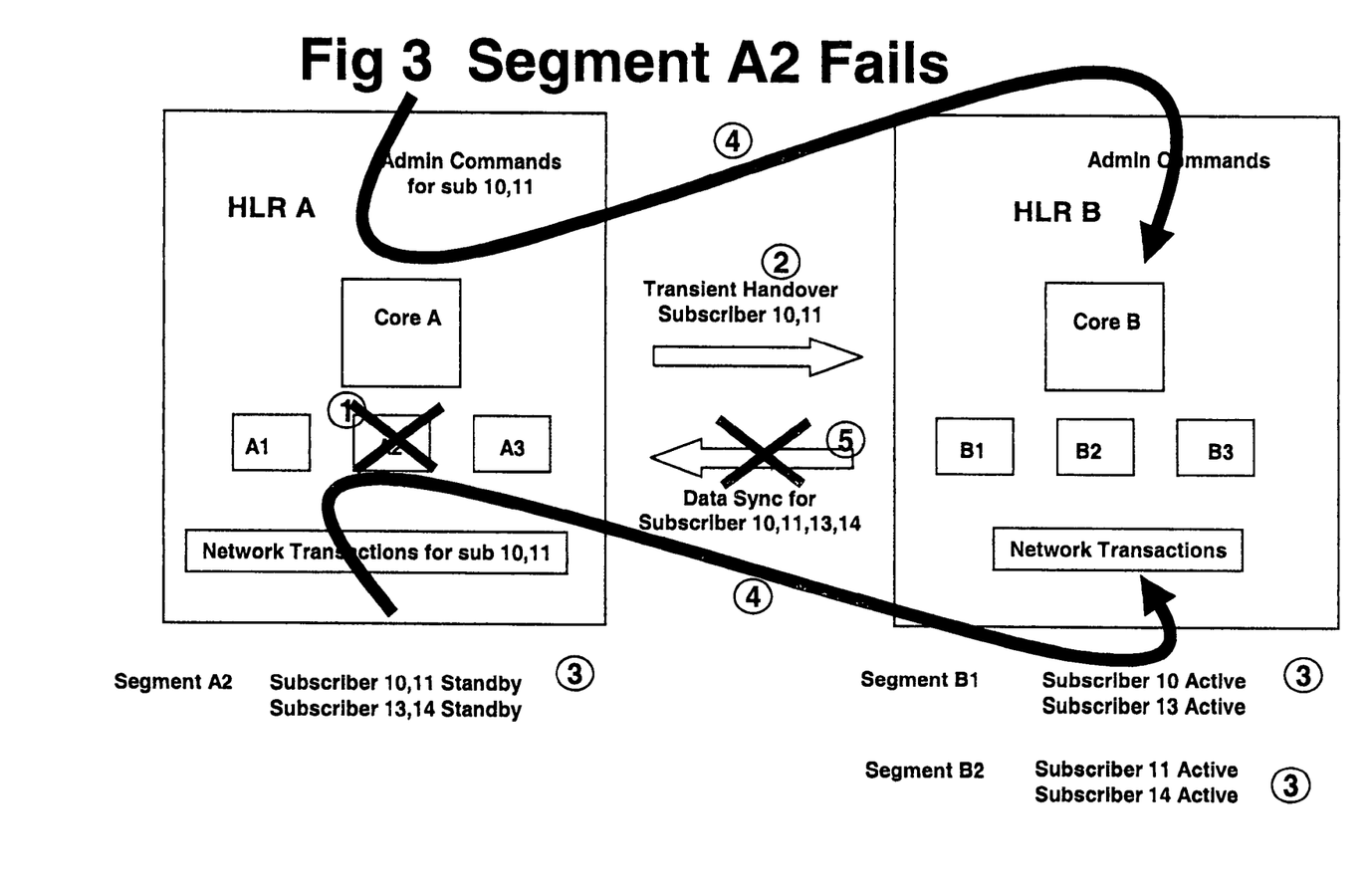
FIGS. 3 and 4 show the embodiment of FIG. 2 when a segment has failed and been repaired respectively.

FIG. 3 Acting Subscribers Handover Control to Mate

The handover process can be triggered manually or by automatic detection of a fault, shown as step 1. It will mark all the subscribers belonging to the segment depending on whether the subscriber is Acting/Standby in the Mated-Pair configuration. The controller will launch a Transient-Handover message to the Mate HLR, for an acting subscriber as shown at step 2 in FIG. 3. This message will cause the subscriber states in both HLRs to change states as shown by step 3 such that the Acting subscriber in the failed segment will assume a Standby state and the Standby state in the Mate HLR will assume the Acting state in atomic operations. Atomic operations mean indivisible operations so that the sequence of messages cannot be interrupted leaving both registers in standby, thus losing service. The Standby state locks the subscriber from carrying out further transactions and diverts all transactions to the Mate HLR, shown by step 4. The Transient-Handover message will also cause the Mate HLR to mark the subscriber to transfer both data and control back to the failed segment when possible, though data synchronization is stopped, as shown by step 5. In addition, the subscriber will be marked in a maintenance state on the Mate HLR so that manual repairs can be affected on the failed segment before data from the Mate HLR is flushed back to the repaired segment. Any data that can be reliably retrieved for the subscriber in the failed segment is sent along with the Transient-Handover.

Figure 4:
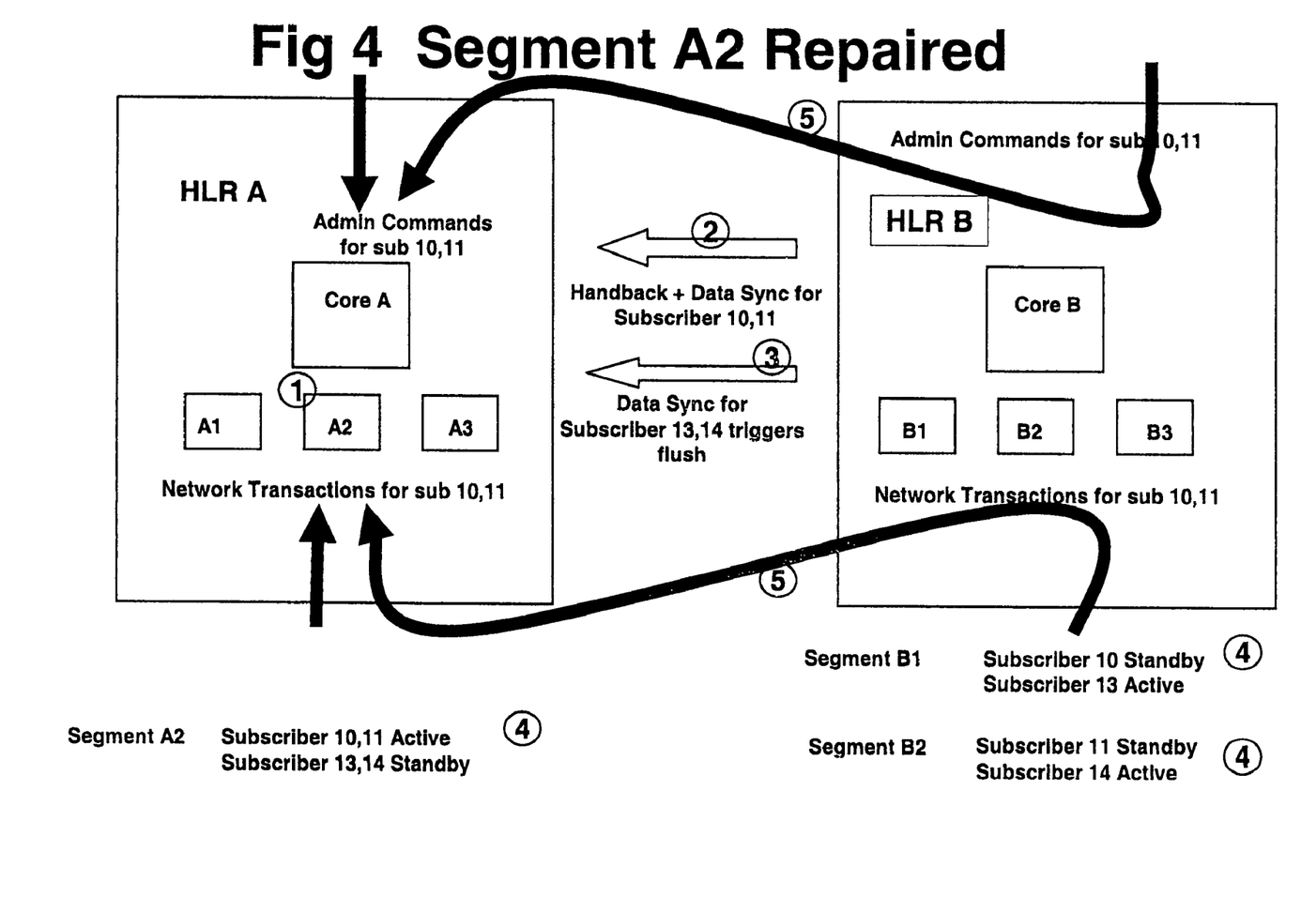

FIG. 4. Handback after Repair of the Fault

Repair of failed segment consists of possible physical repairs, restoration of software and restoration of contextual data required by the repaired segment, shown by step 1 of FIG. 4. Once the failed segment is repaired, a process on the Mate HLR can be activated that will cause the maintenance state to be removed and control and data to be transferred back to the repaired segment with a HANDBACK message at step 2. The subscriber in the repaired segment will receive the most recent data from the Mate, shown as step 3. The change of state will take place again, this time the subscriber state in the working HLR will change from Acting to Standby and the subscriber state in the failing HLR will automatically change from Standby to Acting, shown by step 4. As shown by step 5, once it becomes standby for some subscribers, then HLR B will divert admin commands and network transactions for those subscribers back to HLR A.

Figure 5:
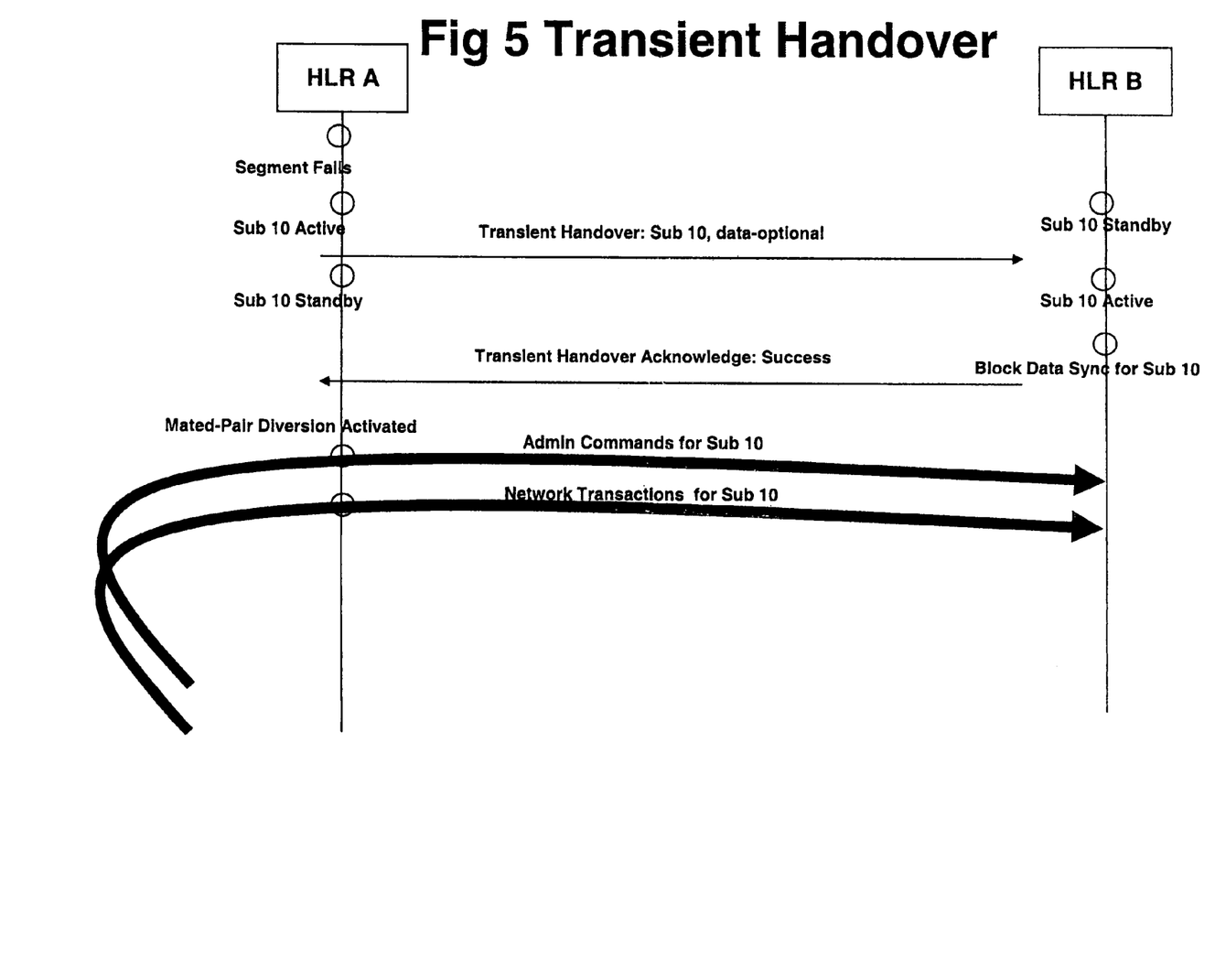
FIGS. 5 and 6 show a sequence chart of events during a transient handover and a handback after repair, according to an embodiment.
Figure 6:
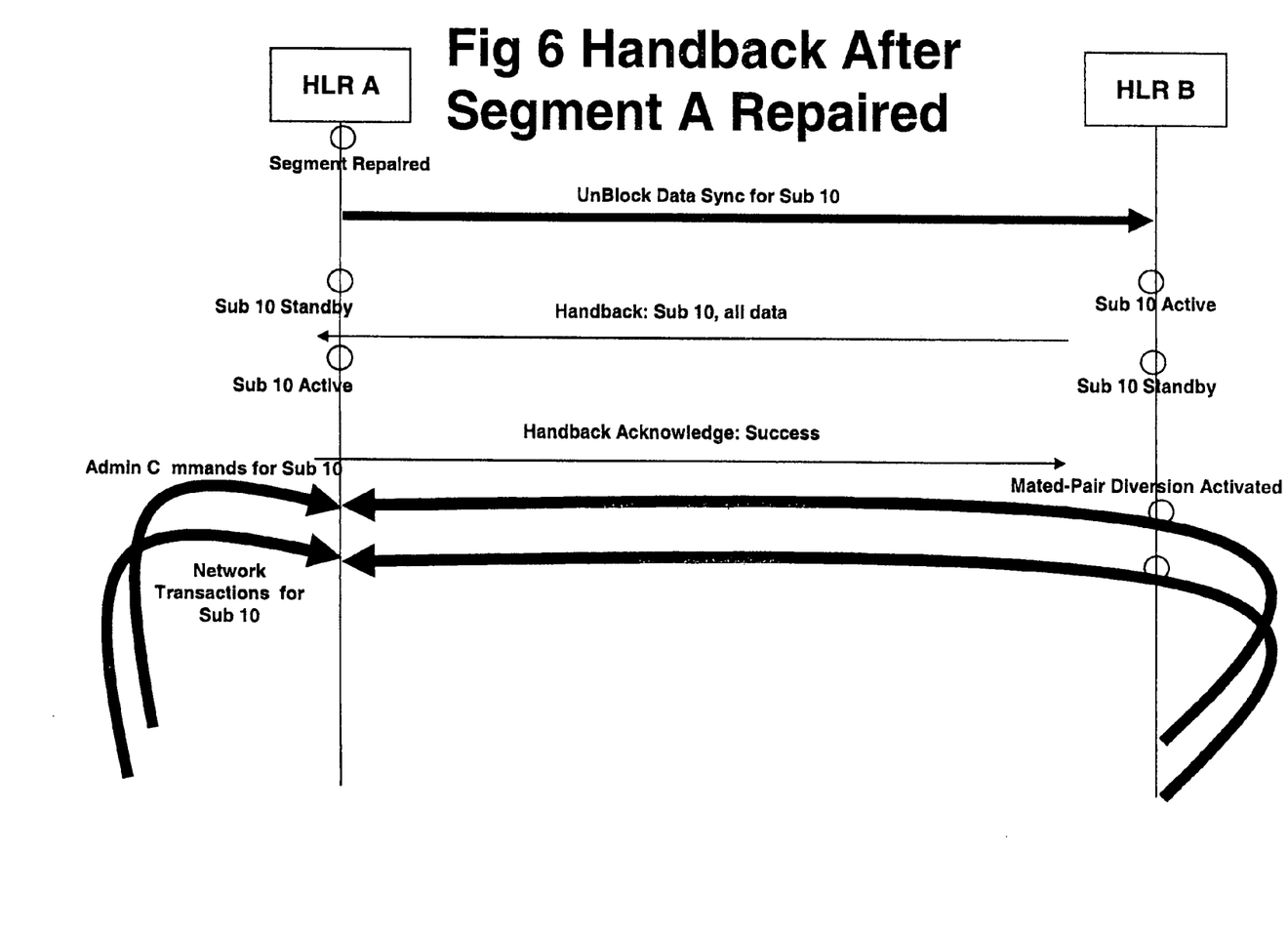

FIGS. 5,6, Sequence Charts of the Transient Handover and Handback Processes FIG. 5 shows a sequence of events in more detail. Time flows down the charts. It starts with segment fail in HLR A. Subscriber 10 is changed from active to standby status and a handover message for subscriber 10 is sent to the mate, HLR B. This can contain any data for the subscriber that has not been corrupted by the failure, that is a consistent and independent set of data for example. At HLR B receipt of this message causes the status of subscriber 10 to be changed from standby to active. An acknowledge message is returned and further data synchronization for this subscriber is blocked. At HLR A after the acknowledgement is received, messages for this subscriber are diverted to the active HLR, HLR B, as soon as the state is Standby. HLR B does not change the state to Standby unless it is ready. There can be a window in the order of milliseconds where both HLRs can be in a Standby state for that one subscriber. Transactions can be blocked in this case, but this is not usually a problem.

This can provide a seamless takeover of active subscriber services (network transactions and administration commands) by the Mate HLR when segment component fails. There is a message protocol for transient handover negotiation that transfers control without transferring unnecessary data, so as to avoid delay. Subscriber services (transactions and commands) are automatically diverted to the mate after the transfer of control to the mate in this example. The mate HLR automatically blocks data synchronisation for affected subscribers so that manual repairs can be carried on the segment.

FIG. 6 shows a corresponding chart for the handback. First the segment is repaired, then an unblock data sync indication is sent to HLR B. This can be a manual or semi-automatic indication. HLR B sends a Handback message with a complete copy of all the data for that subscriber. A complete copy of the data is preferred to just sending updated data, since if there has been a fault it is better to assume that all the data at HLR A for that segment has been corrupted or is unreliable. The subscriber status is returned to standby at HLR B. At HLR A, the status is returned to active when the message is received, and a successful handback is acknowledged to HLR B. The diversion of messages from the network to HLR A is activated again at HLR B.

As described, at the given command, the mate HLR automatically transfers back control and data seamlessly back to the repaired segment. Subscriber services (transactions and commands) are automatically resumed after the transfer of control.

Figure 7:
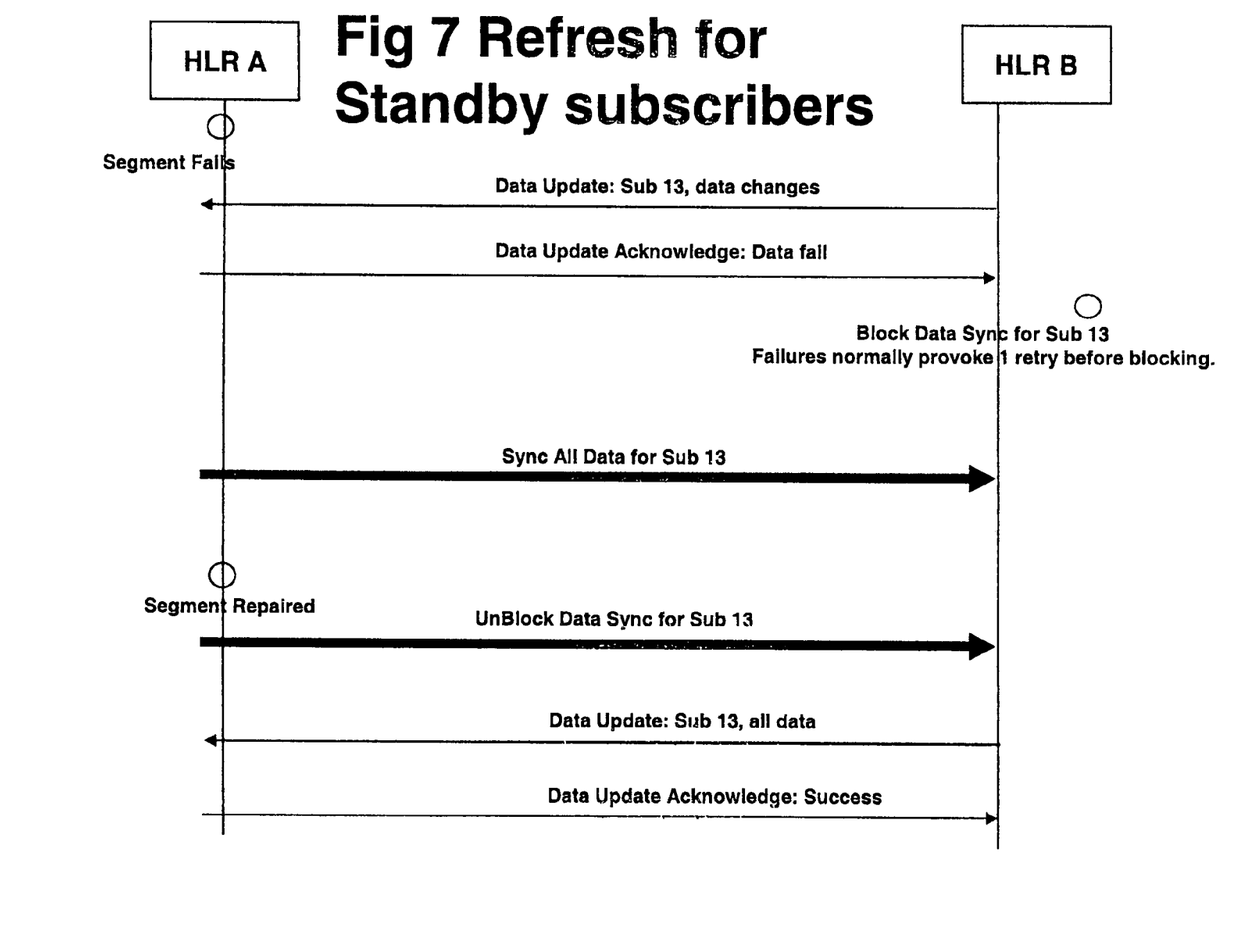
FIGS. 7 and 8 show sequence charts showing alternative schemes for refreshing data for standby subscribers according to an embodiment.
Figure 8:
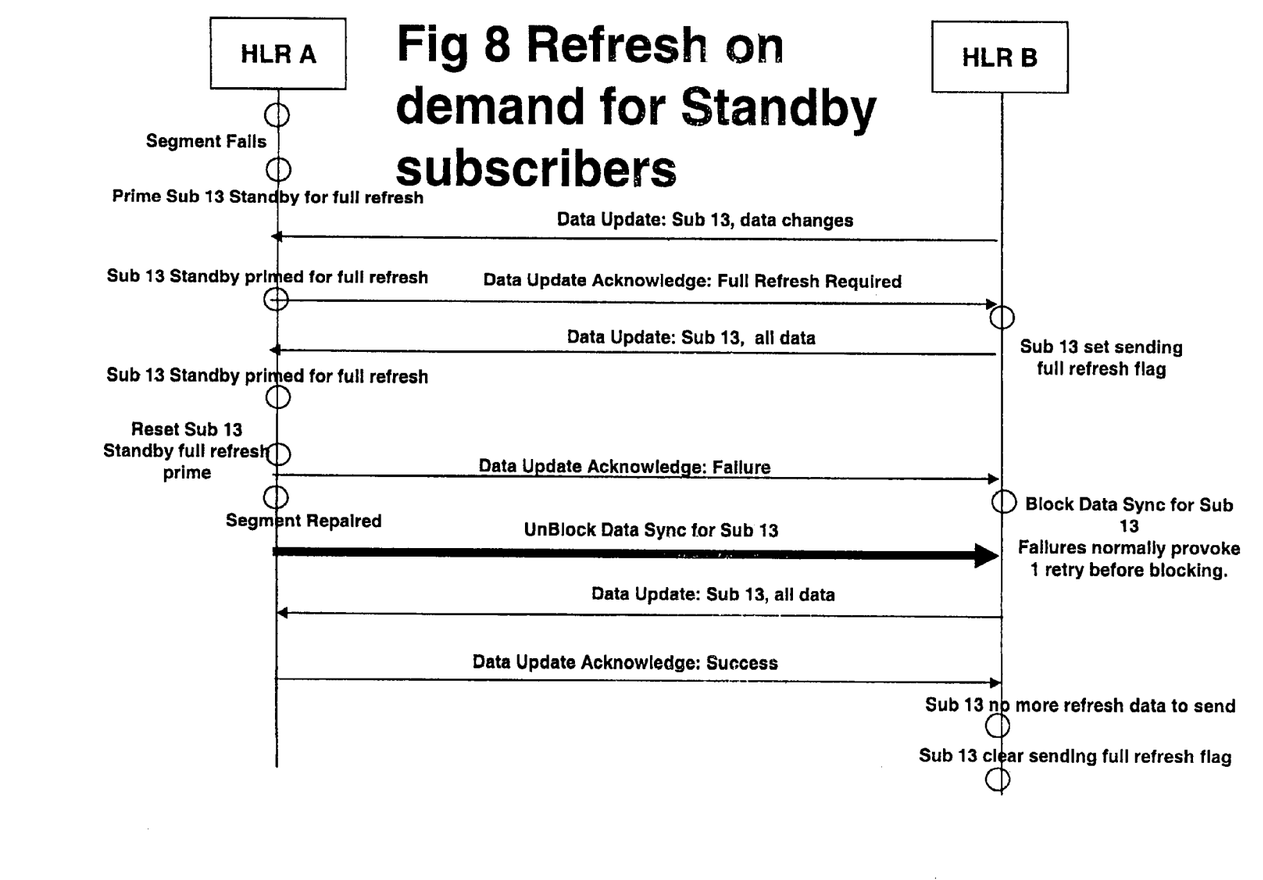

FIGS. 7, 8, Standby Subscribers Trigger Data Refresh

These figures show sequence charts of two alternative processes for handling standby subscribers at the failed segment. Standby subscribers do not have transient handovers. They have an option to trigger off a full refresh by the mate when they get updated or another option is that the mate is triggered to provide a full refresh. These options can be configured to suit the application. When handover is invoked, besides launching Transient-Handovers for subscribers having an active status as described above, controller will mark Standby Subscribers in the failed segment. The marking is such that if it receives a data synchronisation message from the Mate HLR, it will respond with a request to the Mate: to re-synchronise the subscriber with all the subscriber's data instead of incremental updates. The operator is able to invoke a process that batches a command file of all the Standby subscriber's requiring re-synchronisation. This file is applied at the Mate HLR causing all Standby Subscribers to be resynchronised.

FIG. 7 shows that after detecting a failed segment at HLR A, no message is sent until HLR B sends a data update for subscriber 13. HLR A sends back an update acknowledge data fail message. This prompts HLR B to block further synchronization. If preferred a retry is carried out before blocking. HLR A sends a sync all data request to HLR B, but no action is taken while the block is in force. Once the fault is repaired, an unblock data sync indication is sent by HLR A. This can be a manual or semi automatic indication. This prompts HLR B to send a full copy of the data, not just the updated data, since it is safer to assume that all the data is corrupt or invalid for that segment if there is a segment fail.

FIG. 8 shows that after detecting a failed segment at HLR A, subscriber 13 is primed to request a full refresh. No message is sent until HLR B sends a data update for subscriber 13. HLR A sends back an update acknowledge data message requesting a full refresh of the data. HLR B does send a full refresh, and sets a send full refresh flag, but the relevant segment of HLR A is still under repair. Accordingly HLR A sends a data update acknowledge failure message and resets the prime for full refresh for subscriber 13. Then HLR B blocks further synchronization. When the segment is repaired, HLR A sends an unblock indication. Then HLR B sends a data update with a full refresh of all data, and this is acknowledged. Then the send full refresh flag can be cleared.

As described, the message protocol contains a full refresh request to the mate for all data and a handshake to indicate all data transmitted. The full refresh only when triggered by an update provides an on-demand refresh at a time when processing capacity may need to be optimised.

Concluding Remarks

In the embodiments described, the network transactions for the failed segment detect the change of state and are automatically routed to the Mate HLR. Administration commands for provisioning subscriber services are similarly diverted. Takeover and recovery are carried out on a per subscriber basis. Subscriber handover commands are exchanged between HLRs to coordinate the takeover and recovery. As stated above, the commands are seamlessly followed by diversion of network transactions and administration commands.

As described above, the embodiments can involve organizing the HLR into sizeable segments, typically in the region of 1 million subscribers. The HLR is then mated with another HLR to form a mated-pair relationship providing geographical redundancy. When a failure occurs in one of the segments, the mate HLR is used to takeover the processing of services for subscribers belonging to the failed segment. The data in the mate HLR is then used to recover the failed segment after it has been physically repaired. The segments need not have a relationship between the mates. Subscribers belonging to one segment of the HLR do not have to belong to a matching segment in the mate HLR.

Although described for a mobile network such as GSM, it is applicable to other networks with mobile users that are to be tracked, such as motor vehicle or aircraft tracking systems, or railway vehicles (for which a GSM-R network can be used). The network can be an IP (Internet protocol) network or a VPN (virtual private network) for example, using a register to keep track of mobile users who can roam with mobile devices or simply log in from fixed terminals for example. Other variations will be apparent to those skilled in the art, having corresponding advantages to those set out above, within the scope of the claims.

The invention claimed is:

1. A location register for maintaining data relating to current location of users of a mobile telephone network for use by the mobile telephone network, the location register being arranged for coupling to a mate location register at a remote location for back up of the data, the location register comprising a controller which is arranged to divide the data into segments and to carry out a partial handover to the mate location register by handing over maintenance of data of one or some of the segments to the mate location register temporarily,
   wherein the handing over is triggered by a fault in the segments, and wherein the controller maintains a map of which users belong to which segment.

2. The location register of claim 1, the maintaining involving storing and updating the data and responding to network requests to access the data.

3. The location register of claim 1 comprising a home location register.

4. The location register of claim 1, arranged to carry out the handover on a per user basis.

5. The location register of claim 1, the segmentation not being matched at the mate location register.

6. A location register for maintaining data relating to current location of users of a mobile telephone network for use by the network, the location register being arranged for coupling to a mate location register at a remote location for back up of the data, the location register comprising a controller which is arranged to divide the data into segments and to carry out a partial handover to the mate location register by handing over maintenance of data of one or some of the segments to the mate location register temporarily, the controller being further arranged to carry out the partial handover for a given one of the users by sending a message to the mate location register, setting the user's status to standby and diverting to the mate location register any requests from the mobile telephone network to access the data for that user,
   wherein the handing over is triggered by a fault in the segments, and
   wherein the controller maintains a map of which users belong to which segment.

7. A location register for maintaining data relating to current location of users of a mobile telephone network for use by the mobile telephone network, the location register being arranged for coupling to a mate location register at a remote location for back up of the data, the location register comprising a controller which is arranged to divide the data into segments and to carry out a partial handover to the mate location register by handing over maintenance of data of one or some of the segments to the mate location register temporarily, the controller being further arranged to receive a handover request from the mate location register for a given one of the users, to set a user's status to active, and to respond to any requests from the mobile telephone network to access the data for that user,
   wherein the handing over is triggered by a fault in the segments, and
   wherein the controller maintains a map of which users belong to which segment.

8. A location register for maintaining data relating to current location of users of a mobile telephone network for use by the mobile telephone network, the location register being arranged for coupling to a mate location register at a remote location for back up of the data, the location register comprising a controller which is arranged to divide the data into segments and to carry out a partial handover to the mate location register by handing over maintenance of data of one or some of the segments to the mate location register temporarily, the controller being further arranged to initiate a handback operation for a given one of the users, by requesting a copy of the data from the mate location register, and once received, setting the user's status to active, and responding to any requests from the mobile telephone network to access the data for that user,
   wherein the handing over is triggered by a fault in the segments, and
   wherein the controller maintains a map of which users belong to which segment.

9. A location register for maintaining data relating to current location of users of a mobile telephone network for use by the mobile telephone network, the location register being arranged for coupling to a mate location register at a remote location for back up of the data, the location register comprising a controller which is arranged to divide the data into segments and to carry out a partial handover to the mate location register by handing over maintenance of data of one or some of the segments to the mate location register temporarily, the controller being further arranged to respond to a handback request from the mate location register for a given one of the users, by sending a copy of the data to the mate location register, setting the user's status to standby, and diverting to the mate location register any requests from the mobile telephone network to access the data for that user,
   wherein the handing over is triggered by a fault in the segments, and
   wherein the controller maintains a map of which users belong to which segment.

10. The location register of claim 9 arranged to respond to the handback request only when any transaction has ceased.

11. A location register for maintaining data relating to current location of users of a mobile telephone network for use by the mobile telephone network, the location register being arranged for coupling to a mate location register at a remote location for back up of the data, the location register comprising a controller which is arranged to divide the data into segments and to carry out a partial handover to the mate location register by handing over maintenance of data of one or some of the segments to the mate location register temporarily, the controller being further arranged to cease backing up data with the mate location register after a handover has been initiated,
   wherein the handing over is triggered by a fault in the segments, and
   wherein the controller maintains a map of which users belong to which segment.

12. A location register for maintaining data relating to current location of users of a mobile telephone network for use by the mobile telephone network, the location register being arranged for coupling to a mate location register at a remote location for back up of the data, the location register comprising a controller which is arranged to divide the data into segments and to carry out a Partial handover to the mate location register by handing over maintenance of data of one or some of the segments to the mate location register temporarily, the controller being further arranged to request a full copy of data from the mate location register for users of the handed handing over segment for whom the mate location register is normally in an active state, wherein the handing over is triggered by a fault in the segments, and wherein the controller maintains a map of which users belong to which segment.

13. A computer program product comprising a machine readable medium carrying instructions for operating a controller of a location register in a mobile telephone network, the location register being arranged for coupling to a mate location register at a remote location for back up of the data, the instructions causing the controller to divide the data into segments and to maintain data relating to current location of users of a mobile telephone network for use by the network and to carry out a partial handover to the mate location register by handing over maintenance of data of one or some of the segments to the mate location register temporarily, wherein the handing over is triggered by a fault in the segments, and wherein the instruction enable the controller to maintain a map of which users belong to which segment.

14. A method of maintaining data relating to current location of users of a mobile telephone network for use by the mobile telephone network, a location register being arranged to be coupled to a mate location register at a remote location for back up of the data, the method having the steps of dividing the location register into segments, and carrying out a partial handover to the mate location register by handing over maintenance of data of one or some of the segments to the mate location register temporarily, wherein the handing over is triggered by a fault in the segments, and wherein the controller maintains a map of which users belong to which segment.

* * * * *